(12) United States Patent
Maruyama

(10) Patent No.: US 6,259,863 B1
(45) Date of Patent: Jul. 10, 2001

(54) SILVER HALIDE PHOTOGRAPHIC AND ELECTRONIC IMAGE PICKUP CAMERA

(75) Inventor: Atsushi Maruyama, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/595,946

(22) Filed: Jun. 16, 2000

(30) Foreign Application Priority Data

Jun. 18, 1999 (JP) .................................................. 11-173272

(51) Int. Cl.[7] ............................ G03B 15/03; G03B 41/00
(52) U.S. Cl. ..................... 396/177; 396/333; 396/429; 348/64
(58) Field of Search ............................ 348/64; 358/906, 358/909.1; 396/177, 333, 429

(56) References Cited

U.S. PATENT DOCUMENTS 5,740,480 * 4/1998 Kuhn, Jr. et al. ...................... 396/177
5,822,625 * 10/1998 Leidig et al. ............................ 396/77
5,867,741 * 2/1999 Maruyama et al. .................. 396/187

FOREIGN PATENT DOCUMENTS 10-108054   4/1998 (JP) .

* cited by examiner

Primary Examiner—David M. Gray
Assistant Examiner—Arthur A Smith

(57) ABSTRACT

A camera includes an exposure device for exposing an image of a subject on a silver halide film; a pop-up unit capable of popping up out of a camera body to a pop-up position; an image pickup contained in the pop-up unit and capable of picking up an image of the subject in a state in which the pop-up unit is popped up out of the camera body; a mode setting device which allows to selectively set a first operation mode of operating both the exposure device and the image pickup and a second operation mode of operating only the image pickup; and a detector for detecting the position of the pop-up unit. A controller is provided for operating the exposure device and/or the image pickup corresponding to the mode set by the mode setting device in response to a manipulation of a release. The controller operates only the exposure device when the first operation mode is set by the mode setting device and when the detector detects that the pop-up unit is not located at the pop-up position.

10 Claims, 7 Drawing Sheets

SILVER HALIDE PHOTOGRAPHIC AND ELECTRONIC IMAGE PICKUP CAMERA

This application claims the benefit of Japanese Application No. H11-173272 filed in Japan on Jun. 18, 1999, the contents of which are incorporated by reference.

BACKGROUND OF THE INVENTION

1. Field of the Invention

The present invention relates to an improvement of a silver halide photographic and electronic image pickup camera having functions of both an electronic camera having electronic image pickup devices for transforming an image of subject into electrical signals, and a silver halide camera for taking an image of a subject into a silver halide film.

2. Related Art

A silver halide photographic and electronic image pickup camera allows a photographer to confirm an image of subject exposed on a silver halide film and to determine whether or not the image exposed on the silver halide film is what was intended by the photographer by storing the image of the subject photo-electrically transformed by electronic image pickup devices into a memory at the same time when the image of the subject is exposed on the silver halide film and by displaying the image of the subject stored therein on a monitor. The system and structure of a silver halide photographic and electronic image pickup camera is disclosed in Japanese Patent Laid-Open No. Hei. 10-108054 for example.

Japanese Patent Laid-Open No. Hei. 10-108054 has disclosed a silver halide photographic and electronic image pickup camera having a strobe flash unit in which electronic image pickup devices for electronic image pickup and a lens-barrel for imaging light of a subject on the electronic image pickup devices are disposed in a strobe flash section provided at a different position from a lens-barrel for silver halide photography so as to be able to photograph without diminishing the light of the subject exposing the silver halide film and without interfering with the light of the subject to be guided to the electronic image pickup devices by the lens-barrel for silver halide photography. This silver halide photographic and electronic image pickup camera is arranged so as to be able to perform the silver halide photography and the electronic image pickup at the same time by popping up the strobe flash unit when a power switch of a power source for operating the camera is turned on in shooting the subject.

However, although the silver halide photography and the electronic image pickup may be carried out at the same time by popping up the strobe flash unit when the power switch is turned on, there have been cases when the electronic image pickup is not carried out, even though the silver halide photography is carried out, or when the image of the subject of the silver halide photography is erroneously confirmed in confirming the image of the subject by the electronically photographed image of the subject as the lens-barrel included in the strobe flash unit cannot catch a correct image of the subject and different images are taken by the silver halide photography and the electronic image pickup when the strobe flash unit is not popped up as the photographer carelessly presses the strobe flash unit by his/her finger or the like in turning on the power switch or when the strobe flash unit is incompletely popped up as it contacts with something.

The prior art silver halide photographic and electronic image pickup camera having an electronic image pickup function in the strobe flash unit have had problems that only the silver halide photography is carried out and the electronic image pickup cannot be carried out when the strobe flash unit does not pop up as it is carelessly pressed by the photographer in turning on the power switch of the camera and that the image of the subject taken by the silver halide photography is different from the image of the subject taken by the electronic image pickup and the photographer may erroneously confirm the image of the subject taken by the silver halide photography in confirming by the image of the subject taken by the electronic image pickup and displayed on the monitor when the photographer takes the picture in the state when the strobe flash unit is incompletely popped up.

SUMMARY OF THE INVENTION

Accordingly, a primary object of the invention is to provide a silver halide photographic and electronic image pickup camera which is capable of preventing an unintentional picture from being taken as a strobe flash unit is carelessly pressed by a photographer in turning on a power switch of the camera.

A second object of the invention is to provide a silver halide photographic and electronic image pickup camera which is capable of inhibiting an image from being picked up by electronic image pickup devices when the camera is set in an electronic image pickup mode and a pop-up unit is not popped up.

A third object of the invention is to provide a silver halide photographic and electronic image pickup camera which is capable of carrying out a process of warning that the image pickup by the electronic image pickup devices is unexecutable when the camera is set in the electronic image pickup mode and when the pop-up unit is not popped up.

Briefly, a camera of the invention comprises exposure means for exposing an image of a subject on a silver halide film; a pop-up unit capable of popping up out of a camera body; image pickup means contained in the pop-up unit and capable of picking up an image of the image of the subject in a state in which the pop-up unit is popped up out of the camera body; mode setting means which allows to selectively set a first operation mode of operating both the exposure means and the image pickup means and a second operation mode of operating only the image pickup means; detecting means for detecting the position of the pop-up unit; and control means for operating the exposure means and/or image pickup means corresponding to the mode set by the mode setting means in response to a manipulation of a release.

The control means operates only the exposure means when the first operation mode is set by the mode setting means and when the detecting means detects that the pop-up unit is not located at the pop-up position.

The objects and advantages of the present invention will become further apparent from the following detailed explanation.

DESCRIPTION OF THE PREFERRED EMBODIMENTS

Figure 1:
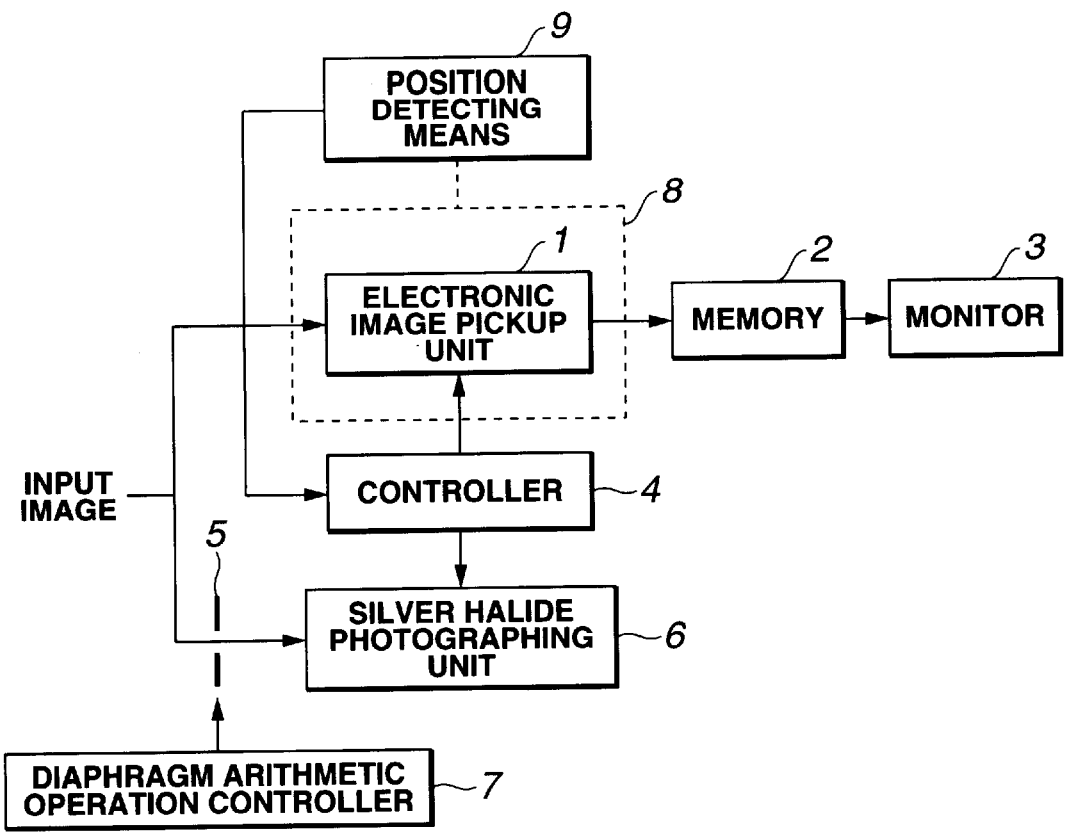
FIG. 1 is a block diagram showing the basic structure of a silver halide photographic and electronic image pickup camera according to a first embodiment of the invention.
Figure 2:
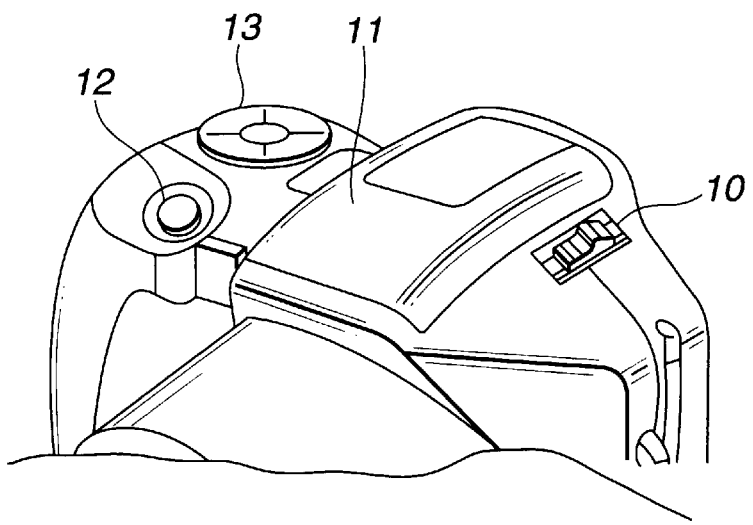
FIG. 2 is a perspective view showing the appearance of the front upper part of the silver halide photographic and electronic image pickup camera of the first embodiment.
Figure 3:
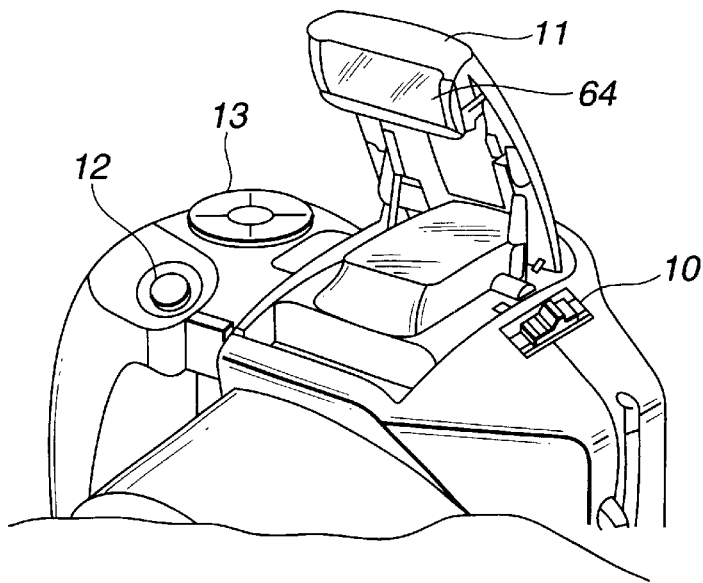
FIG. 3 is a perspective view showing the state in which a pop-up unit is popped up at the appearance of front upper part of the silver halide photographic and electronic image pickup camera of the first embodiment.
Figure 4:
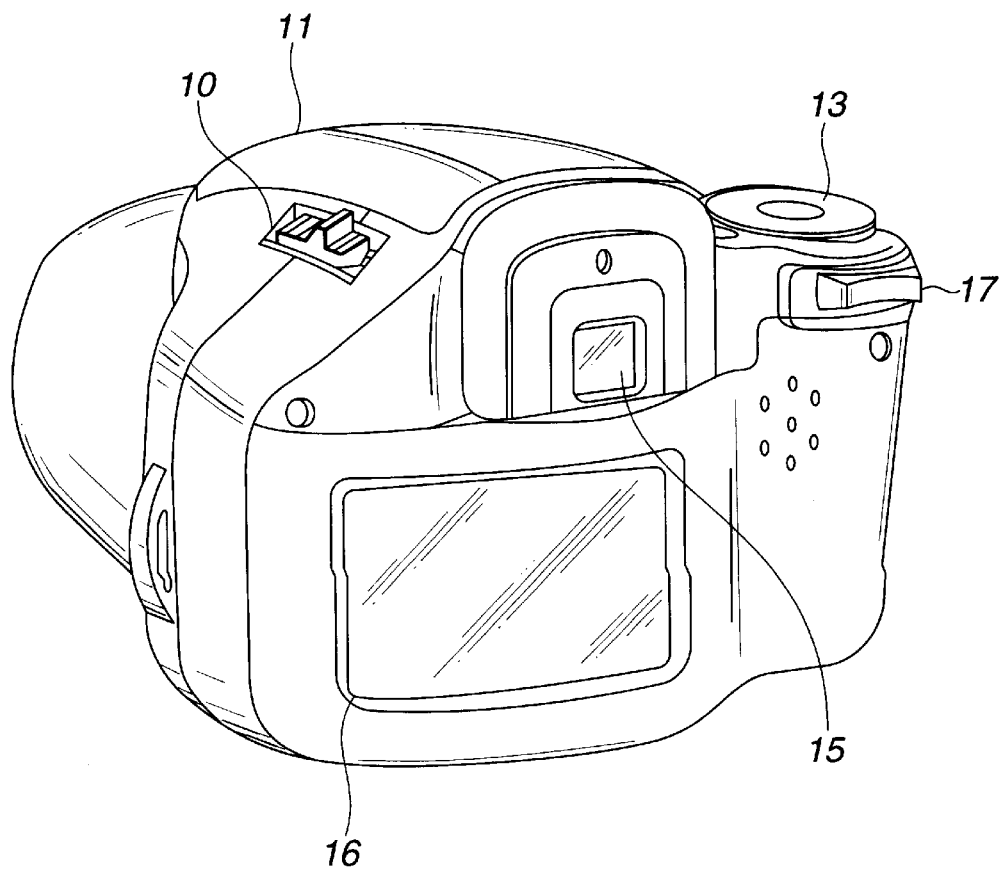
FIG. 4 is a perspective view showing the appearance of the back of the silver halide photographic and electronic image pickup camera of the first embodiment.
Figure 5:
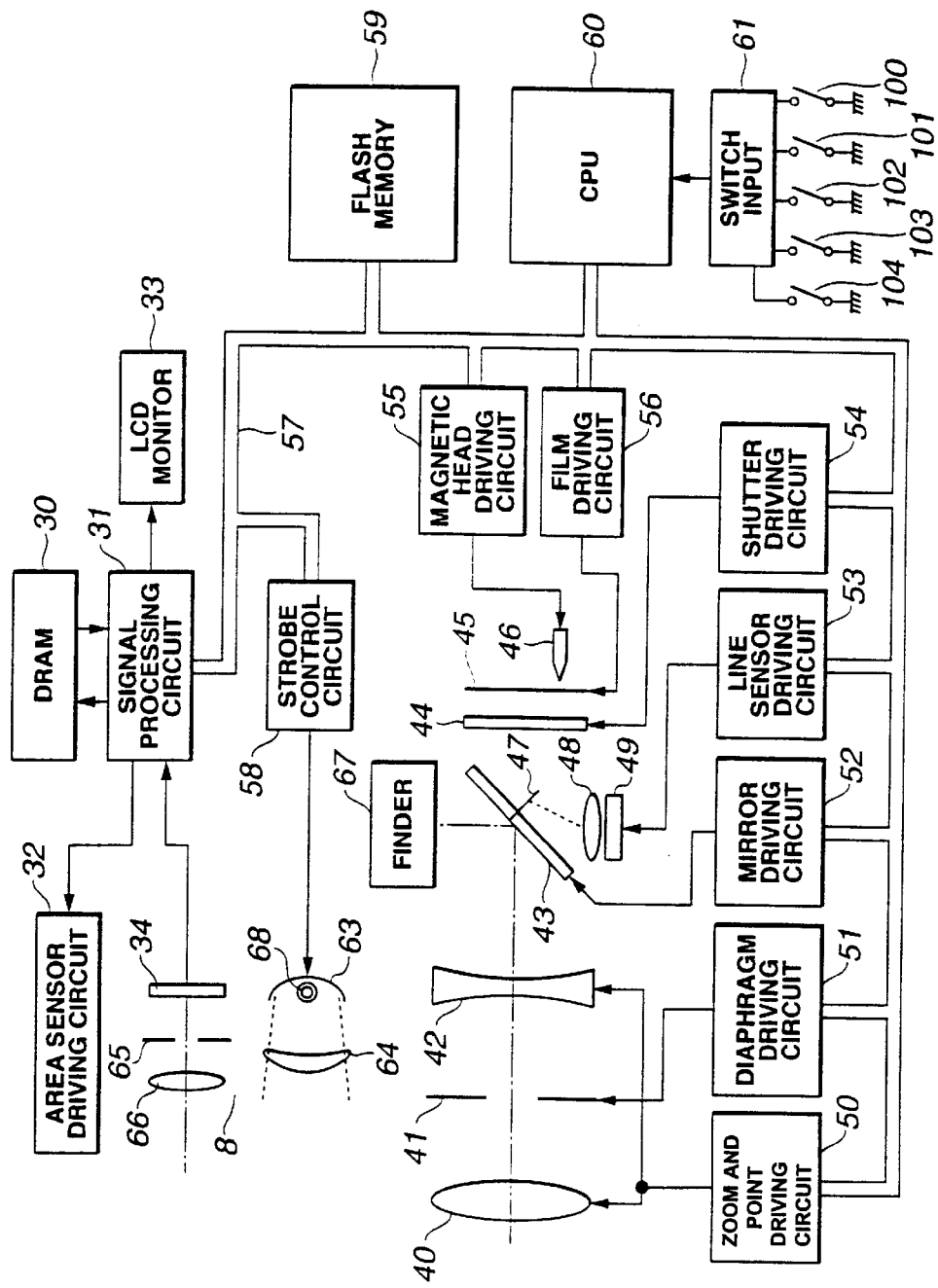
FIG. 5 is a block diagram showing the circuit structure of the silver halide photographic and electronic image pickup camera of the first embodiment.
Figure 6:
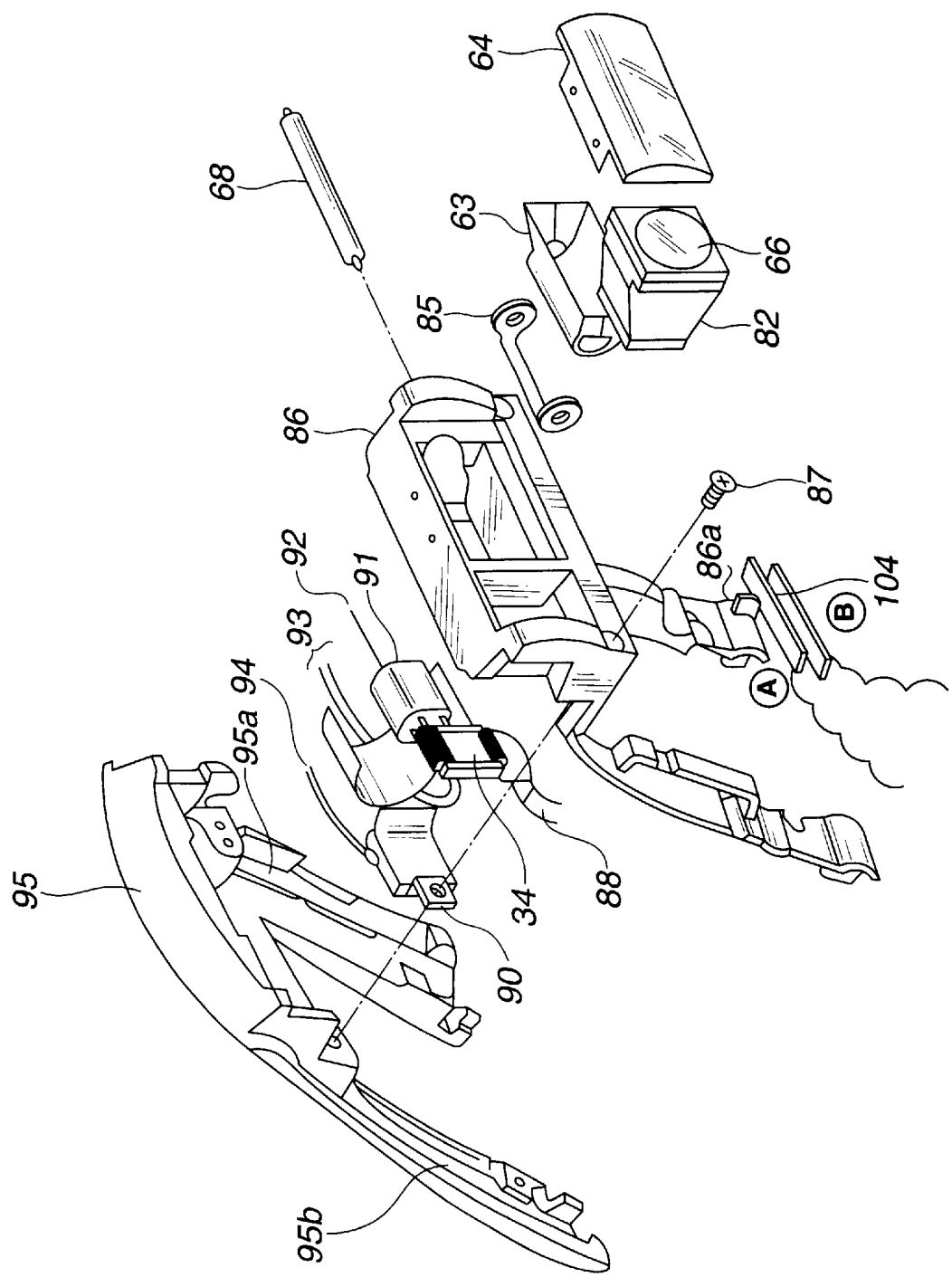
FIG. 6 is an exploded perspective view showing the structure of the pop-up unit of the silver halide photographic and electronic image pickup camera of the first embodiment.

A preferred embodiment of the invention will be explained with reference to FIGS. 1 through 6. FIG. 1 is a block diagram showing the basic structure of a silver halide photographic and electronic image pickup camera according to a first embodiment of the invention, FIGS. 2 through 4 are perspective views showing the appearance of the silver halide photographic and electronic image pickup camera of the first embodiment. FIG. 5 is a block diagram showing the circuit structure of the silver halide photographic and electronic image pickup camera of the first embodiment and FIG. 6 is an exploded perspective view showing the structure of the pop-up unit of the silver halide photographic and electronic image pickup camera of the first embodiment.

As the basic structure of the silver halide photographic and electronic image pickup camera of the first embodiment, an input of image from a subject is transmitted through a diaphragm 5 provided within photographing lenses (not shown) and is imaged and exposed by a silver halide photographing unit 6 on a silver halide film as shown in FIG. 1. The image input is also transmitted through photographing lenses (not shown) and provided separately from the photographing lenses described above and is imaged on electronic image pickup devices (not shown) and provided in an electronic image pickup unit 1.

The electronic image pickup unit and the electronic photographic lenses are stored in a strobe flashing unit 8 constructed so as to move and pop up from the main body of the camera. While at least the electronic image pickup devices must be provided within the strobe flashing unit 8, a signal processing circuit for processing signals from the electronic image pickup devices and other devices may be disposed therein besides the electronic image pickup devices.

The electronic image pickup unit 1 converts the image of a subject formed on the image pickup devices into an analog image signal and implements a known digital conversion to transfer and store the digitally converted electronic image into a memory 2. A monitor 3 is connected to the memory 2 and displays the electronic image stored in the memory 2.

A controller 4 is connected with the electronic image pickup unit 1 and the silver halide photographing unit 6 to selectively or concurrently operate them.

Position detecting means 9 detects the position of the strobe flashing unit 8 which pops up and supplies the detected positional data into the controller 4 to make a control described later.

The image of a subject formed on a film face (not shown) within the silver halide photographing unit 6 is recorded on a silver halide film as a latent image when a shutter is opened. A diaphragm arithmetic operation controller 7 controls a value of the diaphragm of the camera lens so as to restrict the opening of a flux of the subject to be inputted to the silver halide photographing unit 6 via the camera lens.

In correspondence to the output of the controller 4, the silver halide photographic and electronic image pickup camera of the first embodiment constructed as described above receives light of the subject by the electronic image pickup devices within the electronic image pickup unit 1 at the same time that the subject is exposed on the film by the silver halide photographing unit 6. Then, the signal taken from the electronic image pickup devices is converted into an electronic image and is then stored in the memory 2 or displayed on the monitor 3.

The electronic image pickup range is not interfered with by the lens barrel by disposing the electronic image pickup devices within the strobe flashing unit 8 as described above. Further, the flux of the subject arrives at the image pickup devices without being diminished because the camera is provided with an image pickup lens which is different from the camera lens for the silver halide film.

Next, the disposition and structure of the strobe flashing unit 8 in the camera body will be explained with reference to FIGS. 2 through 4. FIG. 2 shows the upper front part of the camera body wherein a pop-up unit 11 is stored. A power switch 10 for turning on/off the power source of the camera is disposed at the upper right side of the camera body, a release switch 12 for indicating the start of operation of the silver halide photographic unit or the electronic image pickup unit and a shooting mode button 13 for specifying a shooting mode are disposed on the upper left side of the camera body and the pop-up unit 11 comprising the electronic image pickup unit 1 and the strobe flashing unit 8 is disposed at the upper center part of the camera body. It is noted that the pop-up unit 11 is capable of popping up out of the camera body and is provided with a strobe flashing device within the unit as described later.

FIG. 3 shows the front upper part of the camera body wherein the pop-up unit 11 is popping up. In linkage with the ON operation of the power switch 10, the pop-up unit 11 pops up mechanically. A light flashing panel 64 for transmitting strobe light is provided at the position almost at the front of the strobe flashing unit 8 when the pop-up unit 11 pops up.

FIG. 4 shows the back of the camera body. Disposed on the back are an eyepiece window 15 of an optical finder for observing the image of a subject based on the light of the subject transmitted through the camera lens, a monitor screen 16 for displaying the image of the subject based on the image signal outputted from the image pickup devices and a zoom up/down control button 17 for manually changing the focal distance of a zoom lens.

Next, the operation of the camera manipulated by a photographer will be explained. When the photographer manipulates the power switch 10 to turn on the driving power of the camera, the pop-up unit 11 pops up and the camera lens (not shown) for guiding the light of the subject to the silver halide photographing unit 6 is drawn out of a barrel submerging position to wide position at the same time.

Next, the photographer decides the composition of the subject to be photographed while watching the eyepiece window 15 of the optical finder. The focal distance of the camera lens may be changed arbitrarily by manipulating the zoom up/down control button 17. When the photographer decides the composition of the subject to be photographed and is ready to take a picture, the photographer can start the photographing sequence described later by pressing the release button 12. At this time, an image of the subject is exposed on a film and is picked up by the electronic image pickup devices at the same time. The electronic image is taken into the camera and is displayed on the monitor 16. When the photographer confirms the image on the monitor and judges that it is not what reflects his own photographing intention, the photographer can photograph again.

Next, the circuit structure of the silver halide photographic and electronic image pickup camera will be explained with reference to FIG. 5.

This camera comprises a group of a plurality of lenses for silver halide photography, a block of a finder optical system for forming an observing image of a subject by receiving flux from the subject (hereinafter referred to as the light of the subject) which has been transmitted through the lens group, a block related to a silver halide photographic unit for exposing the image of the subject formed by the plurality of lenses for silver halide photography on a silver halide film, a block related to a strobe flash unit for flashing the strobe light to the subject, a group of a plurality of lenses for electronic image pickup which is different from the lenses for silver halide photography, image pickup means such as image pickup devices for transforming the image of the subject formed by the lens group into electrical signals, an LCD monitor such as a liquid crystal display for displaying a corresponding image based on the image signal outputted from the image pickup means, a block related to the electronic image pickup unit comprising a flash memory such as a non-volatile memory for recording the obtained image in a predetermined mode, and a control input switch group for generating predetermined command signals or control signals in linkage with various manipulating members and other various electrical circuits. All of the electrical circuits of the camera are generally controlled by a CPU, i.e., control means.

The structure of the block related to the silver halide photographic unit will be explained below.

As shown in FIG. 5, the group of the plurality of lenses for silver halide photography comprises a plurality of lenses such as a positive lens 40 and a negative lens 42 and a first diaphragm mechanism 41 provided at a predetermined position on an optical axis of those plurality of lenses 40 and 42. The lens group for silver halide photography is a so-called zoom lens capable of variable power operation for changing the focal distance continuously.

The positive and negative lenses 40 and 42 are driven and controlled by a zoom and point driving circuit 50. Predetermined automatic focus controlling operation (AF operation) and predetermined variable power operation (zooming) are thus carried out. Further, the first diaphragm mechanism 41 for controlling exposure is driven and controlled by a diaphragm driving circuit 51.

The group of lenses for silver halide photography comprising the positive and negative lenses 40 and 42 and the first diaphragm mechanism 41 and the electrical circuits such as the zoom and point driving circuit 50 and the diaphragm driving circuit 51 are disposed at predetermined positions, respectively, within the silver halide camera lens barrel (not shown) as a holding member for holding them.

It is noted that the zoom and point driving circuit 50 comprises a driving source such as a general electromagnetic motor and an ultrasonic motor, a driver circuit for controlling such driving source and an encoder unit and the like for detecting the position of each lens by generating a predetermined signal corresponding to movement of the positive and negative lenses 40 and 42 (its detail will be omitted here).

A movable mirror 43 whose center part is formed by a half mirror or the like and whose one end is turnably and axially supported to an internal fixing member (not shown) of the camera is disposed at a predetermined position behind the lens group for silver halide photography and on the optical axis. The movable mirror 43 is disposed so as to tilt by a predetermined angle, e.g., 45 degrees, with respect to the optical axis of the lens group for silver halide photography and so that its reflecting plane faces to the lens group for silver halide photography (the subject side) and to the upward direction in the state when no photographing operation is executed (called a photography preparing state).

A mirror driving circuit 52 is electrically connected with the movable mirror 43 and drives and controls the movable mirror 43 by receiving a predetermined control signal from the CPU 60. That is, a so-called quick return mechanism is constructed by the movable mirror 43 and the mirror driving circuit 52.

Accordingly, when the camera is in the photography preparing state, a part of the light of subject which has transmitted through the lens group for silver halide photography is reflected upward by the reflecting plane of the movable mirror 43 to be guided to the block comprising the finder optical system disposed above the movable mirror 43.

Meanwhile, a sub-mirror 47 formed of a total reflection mirror is provided turnably with respect to the movable mirror 43 approximately at the center of the back of the movable mirror 43. The sub-mirror 47 plays a role of reflecting the light of the subject which has transmitted through the half-mirror part of the center of the movable mirror 43 to guide same to a predetermined position below the sub-mirror 47. It is noted that the sub-mirror 47 is also driven and controlled by the mirror driving circuit 52 described above.

A separator optical system 48 which is comprised of two optical systems for separating the flux of the subject into two images is disposed at the predetermined position below the sub-mirror 47 and on the reflecting optical axis of the sub-mirror 47. A line sensor 49 is disposed at the position where the image of the subject to be formed again by the separator optical system 48 is formed. A line sensor driving circuit 53 is electrically connected with the line sensor 49 to drive and control it by receiving a predetermined control signal from the CPU 60.

A focus detecting unit utilizing the general phase difference detecting method is constructed by these components, i.e., the sub-mirror 47, the separator optical system 48, the line sensor 49, the line sensor driving circuit 53 and the like. Here, the CPU 60 calculates the distance between the two images formed by the separator optical system 48 based on a signal inputted from the line sensor 49 via the line sensor driving circuit 53 and calculates a degree of drive of the lens and the like in carrying out the focus control operation. Information such as the degree of drive thus calculated, i.e., the degree of drive of the lens calculated by the CPU 60 by receiving the output (integral result) from the line sensor 49 and an output from the encoder unit (lens position information) are transmitted to the zoom and point driving circuit 50 via the CPU 60 so as to allow the photographer to control the focus control operation and to carry out the variable power operation at the same time by driving the respective lenses 40 and 42 of the lens group for silver halide photography to a desired position (focal point).

A shutter mechanism 44 for restricting a quantity of irradiation (exposure time) of the flux of the subject to the light receiving plane of the silver halide film 45 (hereinafter referred to simply as a film) in carrying out an operation for exposing to the film 45 is disposed behind the movable mirror 43 and the film 45 is disposed at a predetermined position right behind the shutter mechanism 44 with a predetermined interval.

The shutter mechanism 44 is driven and controlled by the CPU 60 via a shutter driving circuit 54. For instance, when the movable mirror 43 is turned into the upward direction in the figure by the mirror driving circuit 52, the shutter mechanism 44 is driven and controlled so that it is opened for a predetermined time by the shutter driving circuit 54. Thereby, almost all of the fluxes transmitted through the lens group for silver halide photography is irradiated to the light receiving plane of the film 45, the image of subject formed as described above is formed on a film emulsion plane (light receiving plane) and exposure is executed to the film 45 in a predetermined manner.

It is noted that a focal plane shutter or the like which is generally utilized in a prior art single-lens reflex camera for example is applied as the shutter which comprises a part of the shutter mechanism 44. The focal plane shutter is constructed so as to run leading and trailing curtains in a predetermined direction at a predetermined interval between one end to the other end of a picture screen by utilizing an urging force of an urging means charged before the exposure operation in normal cases. A focal plane shutter which has been generally put into practical use is used in the shutter mechanism 44 and its detailed explanation will be omitted here.

It is noted that the film 45 used in this camera is a photographic rolled silver halide film wound and stored in a film cartridge of a general type. A magnetic recording layer and others in which various information may be magnetically recorded are formed at a predetermined area of the film 45 on the light receiving plane, i.e., the back of the emulsion plane, thereof. A magnetic head 46 is disposed so as to abut to the magnetic recording layer at a predetermined position of the camera side facing the magnetic recording layer.

The magnetic head 46 is capable of recording various information magnetically on the predetermined area (magnetic recording layer) on the film 45 and is driven and controlled by the CPU 60 via the magnetic head driving circuit 55.

A film driving circuit 56 for controlling a film feeding operation is also provided near the film 45 charged within the main body of the camera. The film driving circuit 56 implements a control for automatically winding up the film 45 by a predetermined amount every time when the photographing operation of one frame is completed for example to dispose the next frame (non-exposure part of the film) at the predetermined position within the camera by a driving force transmitted via a film feeding mechanism (not shown) comprising a gear train and others for feeding the film.

It is noted that the operation for magnetically recording predetermined information on the film 45 by the magnetic head 46 described above is executed in linkage with the operation for winding up the film 45 by a film driving circuit 56 and others.

Disposed above the movable mirror 43 and on an optical path of the light of the subject (flux of finder) reflected by the movable mirror 43 is a finder eyepiece window and others comprising a focusing plate formed so as to form the image of the subject (hereinafter referred to an observed image) to be formed by the flux of finder and to allow to confirm the focus state of the observation image, a penta-prism for converting images so as to allow the photographer to observe the observation image by an erecting non-reverse image and lenses for imaging again the image of the subject which has been converted into the erecting non-reverse image by the penta-prism. The finder optical block 67 is constructed by these members, i.e., the focal plate, the penta-prism, the finder eyepiece window and other elements.

That is, in the camera of the present embodiment, the finder optical block 67 for observing the image of the subject (observed image) optically formed is provided in parallel as means for observing the image of the subject in addition to display means (LCD monitor 33) in the electronic image pickup unit described later.

The finder optical block 67 is provided in the camera of the present embodiment in addition to the display means for the following reasons. The ordinary silver halide camera is normally provided with the finder optical block 67 as means for confirming the observation image in taking a picture.

There is a case when no good picture can be obtained when the camera moves even slightly as so-called blur occurs while taking a picture. Accordingly, the camera must be held firmly during the photographing operation. Because the camera is always placed near the face, i.e., the eye, of the user when the finder optical block 67 is used in this case, the camera is supported by part of the face in addition to the both hands. Accordingly, it is possible to hold the camera firmly and to prevent blur from occurring when the observation image is to be observed by using the finder optical block 67.

Meanwhile, a prior art electronic image pickup unit is provided with display means such as a liquid crystal display for displaying an observation image prior to the image pickup operation or a picture which has been taken and the display means is normally used as a finder. The camera itself must be normally separated by a certain distance from the eye of the user to observe the image displayed on the display unit. Accordingly, the user must hold the camera only by the both hands in taking a picture while confirming the observation image by using the display means. Accordingly, the camera is liable to be put into the unstable state as compared to the case of taking a picture while observing the observation image by using the optical finder, thus causing the problem of blur and the like.

However, such camera has a merit that the user can take a picture readily from various shooting angles in executing the shooting operation while confirming the observation image by utilizing the display means because the camera is separated from the eye of the user and there is no restriction on how to take a picture.

Accordingly, the camera is provided with the display means for receiving an electrical image signal and displaying an observation image corresponding to that and the finder optical system which allows the user to directly observe an optically formed observation image and allows the user to use them appropriately to shoot favorably or to obtain a better shooting result.

A switch input 61 comprises a plurality of switches such as various control switches for generating predetermined command signals in linkage with each control member (not shown) for controlling the camera variously and detecting switches for detecting mechanical states. For instance, it includes a power switch 100 for generating an ON/OFF signal of the power switch 10 for turning on/off the driving power source of the camera, a first release switch 101 for generating a predetermined ON signal in linkage with the first control of the release button 12, a second release switch 102 for generating a predetermined ON signal in linkage with the second operation of the release button 12, a shooting mode switch 103 for photographing mode for a setting a desired photographing mode and the like by generating a predetermined signal corresponding to various photographing modes and a pop-up switch 104 for detecting the pop-up state of the pop-up unit 11.

The camera of the present embodiment also comprises a non-volatile semiconductor memory (not shown) such as an EEPROM provided to store various information such as control data related to the structural member of the camera, the camera operating state, a program diagram for deciding appropriate exposure and others.

Next, the structure of the block related to electronic image pickup will be explained.

The block related to the electronic image pickup unit of the camera of the present embodiment comprises a lens 66 in the lens group for electronic image pickup, image pickup means comprising image pickup devices 34 including an area sensor such as a CCD for transforming the image of the subject formed by the lens 66 into electrical signals and an area sensor driving circuit 32 for driving and controlling the image pickup device 34, an LCD monitor 33 such as a liquid crystal display which is a display means for displaying an image represented by image signals outputted from the area sensor driving circuit 32 and a flash memory 59 such as a non-volatile memory which is recording means for recording in a predetermined mode the image signal which has been obtained by the image pickup device 34 and has been transformed into a predetermined mode.

The electronic image pickup lens 66 is a so-called single focus lens which is provided separately from the silver halide photographing lenses 40 and 42 described before and is set at a single focal distance. A second diaphragm mechanism 65 is provided at a predetermined position on the optical axis of the electronic image pickup lens 66.

The electronic image pickup lens 66 is driven and controlled by a predetermined driving circuit (not shown) so as to execute the predetermined AF operation and others. The second diaphragm mechanism 65 is also driven and controlled by a predetermined driving circuit (not shown) to carry out an exposure operation and others.

The electronic image pickup lens group comprising components such as the lens 66 and the second diaphragm mechanism 65 and the electrical circuit such as various driving circuits related to them are held at a predetermined position within the lens barrel (not shown) as a holding member.

The image pickup device 34 is disposed at a predetermined position behind the electronic image pickup lens 66 and on the optical axis. The image pickup device 34 is electrically connected with the area sensor driving circuit 32 which implements predetermined signal processing and others by receiving the photo-electrically converted image signal. The area sensor driving circuit 32 is connected with a signal processing circuit 31. Receiving the image signal (analog signal) processed by the area sensor driving circuit 32, the signal processing circuit 31 converts it into a digital signal and implements data processing of predetermined image signals. The digital image signal data generated by the signal processing circuit 31 is supplied to the LCD monitor 33 such as a liquid crystal display which is the display means for displaying images and to the flash memory 59 or the DRAM 30 to be written and stored. The various information data described above is photographing date data generated by control means not shown and address data to be written and stored in the DRAM 30 or the flash memory 59.

The block related to the electronic image pickup unit of the camera comprises a volatile memory capable of executing a writing process (recording process) at high speed. It also comprises the DRAM 30 which is temporary storage means for receiving and temporarily storing the output from the signal processing circuit 31 and for temporarily storing image signals read from the flash memory 59 described later, the flash memory 59 which is recording means such as the non-volatile memory for reading and recording the image signals temporarily stored in the DRAM 30 at predetermined timing and the LCD monitor 33 for receiving the image signals from the DRAM 30 or the flash memory 59 to implement the optimum signal processing for displaying as images and then to display the image.

The flash memory 59 can electrically rewrite the electrical image signal representing the image and hold the recorded electrical image signal even when no power is supplied from a battery (not shown) as a main power source of the camera. While it is put into practical use in general, a small card type PC card and the like is applied here.

It is noted that the image pickup angle set by the electronic image pickup lens 66 is set so that it is located at the shortest focus side among the shooting angles set by the silver halide shooting lens group, i.e., so that it is almost equal to the shooting angle when it is located at the so-called wide end.

When the focal distance set by the silver halide photographic lens group is dislocated by the zoom and point driving circuit 50, i.e., when the zooming operation is carried out, a predetermined enlarging process or reducing process (so-called electronic zooming process) is implemented so as to coincide approximately with the shooting angle corresponding to the focal distance of the silver halide photographic lens group to the image signal obtained by the electronic image pickup unit in linkage with the zooming operation. The image signal is then output to the LCD monitor 33 to display a corresponding image. Thereby, the display angle of the electronic image displayed on the LCD monitor 33 always coincides approximately with the image angle of the latent image actually recorded in the film 45.

The strobe irradiation angle of the strobe flashing unit 8 is set so that it coincides approximately with the shooting angle on the shortest focal point side (wide end) in the silver halide photographic lens group.

Meanwhile, the CPU 60 also plays a role of calculating the optimum value of the diaphragm and value of the shutter speed for causing the appropriate exposure to a desired subject by receiving information related to a value of brightness of the subject outputted from the area sensor driving circuit 32 and the sensitivity of film detected from the magnetic recording layer (or the casing of the film cartridge) of the film by a film sensitivity detecting circuit (not shown) and various information such as the program diagram stored in advance in a ROM and the like provided within the camera. Then, based on the result of calculation, the CPU 60 drives and controls the first diaphragm mechanism 41 via the diaphragm driving circuit 51 to set a predetermined value of the diaphragm and drives and controls the shutter mechanism 44 via the shutter driving circuit 54 to operate at a predetermined shutter speed.

The camera also comprises the strobe flashing unit 8 for auxiliary illuminating the subject. That is, the strobe flashing unit 8 of the camera of the present embodiment comprises respective members and predetermined electrical circuits such as a strobe circuit 58 for receiving a command signal from the CPU 60 to control the strobe flashing operation, a strobe flash tube 68 such as a xenon tube in which xenon gas (Xe gas) is charged, a reflecting umbrella 63 for reflecting the strobe light from the flash tube 68 to a predetermined one direction (mainly in the direction of the subject) and a flash panel 64 such as Fresnel lens which is a transparent or semi-transparent member provided at the front side of the reflecting umbrella 63 so as to cover the opening for outputting the strobe light to condense or diverge the strobe light to be flashed from the strobe flashing unit 8 into a predetermined range.

The flashing operation of the strobe flashing unit 8 in the camera of the present embodiment is driven and controlled by the CPU 60 via the strobe circuit 58 which is a charge control circuit.

In this case, the CPU 60 has a so-called auto-strobe function of automatically executing the predetermined flashing operation by a predetermined quantity of flash by synchronizing with the exposure operation of the shutter mechanism 44 caused by the shutter driving circuit 54 when it is judged that the value (measured value)of brightness of the desired subject to be photographed is lower than the predetermined value of brightness set in advance by making reference to the result of photometry obtained by the value of brightness of the subject outputted from the area sensor driving circuit 32 described above for example.

Further, the strobe flashing unit 8 is contained in the pop-up unit 11 having the pop-up function described later and is provided with the pop-up switch 104 for detecting that the pop-up unit 11 is popped up out of the camera body. The CPU 60 judges the information on the pop-up operation detected by the pop-up switch 104 and controls the camera corresponding to the shooting operation mode of the silver halide photography and/or the electronic image pickup.

The various electrical circuits and electrical members such as the zoom and pint driving circuit 50, the diaphragm driving circuit 51, the mirror driving circuit 52, the line sensor driving circuit 53, the shutter driving circuit 54, the film driving circuit 56, the magnetic head driving circuit 55, the flash memory 59, the DRAM 30, the signal processing circuit 31, the LCD monitor 33, the strobe control circuit 58 and others are connected electrically with the CPU 60 via a data bus 57. Thereby, the data of the electrical signals are exchanged as necessary and the predetermined control signals for the CPU 60 to totally control the whole circuits are transmitted to the various electrical circuits.

Next, the structure of the pop-up unit 11 containing the strobe flashing unit 8 of the camera of the present embodiment will be explained with reference to FIG. 6. The flash panel 64 for condensing and irradiating the strobe light, the strobe flash tube 68 in which Xe gas is filled, the reflecting umbrella 63 for reflecting the flash of the strobe flash tube 68, and a fixing member 85 for fixing the strobe flash tube 68 to the reflecting umbrella 63 are stored in a frame member 86 in a body. Disposed behind the frame member 86 are a trigger transformer 91 for generating high voltage for exciting the Xe gas of the strobe flash tube 68, a wiring member 92 connected with the reflecting umbrella 63 to transmit the high voltage generated by the trigger transformer 91 to a trigger electrode of the strobe flash tube 68 and a wiring member 93 which is connected with the strobe control circuit 58 (see FIG. 5) of the camera body and is a control line of the trigger transformer 91.

The lens 66 for forming the image of the subject on the image pickup device 34 is fixed to an optical path member 82 for guiding the light of the subject to the image pickup device 34 and the optical path member 82 is stored in the frame member 86. The image pickup device 34 stored in a clear package is disposed behind the optical path member 82 and is connected with a flexible substrate 88 for laying a signal line for controlling from the camera body. A conductive metal plate 90 is disposed behind the image pickup device 34. The metal plate 90 is grounded by connecting it with a minus pole of the power source of the camera via a wiring member 94. The metal plate 90 shields the image pickup device 34 or the signal line of the image pickup device 34 from electromagnetic wave noise generated in flashing the strobe.

A wiring member (not shown) for connecting the wiring member 93 which is a control line of the trigger transformer 91, the anode and cathode of the strobe flash tube 68 and the strobe control circuit 58 of the camera body (see FIG. 5) is laid along a guide groove 95a of a supporting frame 95. The flexible substrate 88 and the wiring member 94 are laid along a guide groove 95b of the supporting frame 95. The wiring member 93 connected to the strobe control circuit 58 is laid along the guide groove 95a and the wiring related to the image pickup device 34 is laid along the guide groove 95b to avoid an adverse influence which is otherwise brought about to the image pickup device 34 or the signal line of the image pickup device 34 while operating the image pickup device 34 because the strobe is operated as an auxiliary illumination when the brightness of the subject is low and the electromagnetic wave noise occurs in flashing the strobe. Then, the wiring member of the strobe is laid while keeping a predetermined interval from the wiring member of the image pickup device.

Black printing is implemented on the whole substrate surface of the flexible substrate 88 to prevent internal reflection of unnecessary light and to prevent detrimental light other than the photographic light from being inputted to the image pickup device 34. The black printing may be carried out by using a black material as a cover-lay of the substrate or the same effect may be obtained even when a black mold is pasted on the substrate, thus obtaining the similar effect.

The pop-up switch 104 comprised of electric pieces A and B having the quality of a spring is fixed to the camera body to detect the position of the movable strobe flash unit 11. The electrical pieces A and B are turned on/off by pressing a projection 86a of the frame member 86. That is, the pieces turn on when the pop-up unit 11 is stored and turn off when the pop-up unit 11 is popped up. The electrical piece A is connected to the switch input 61 and the electrical piece B is connected to the minus pole of the power source not shown of the camera. It is noted that the switch 104 described above may be a photo-interrupter or a photo-reflector for optically detecting position.

Figure 9:
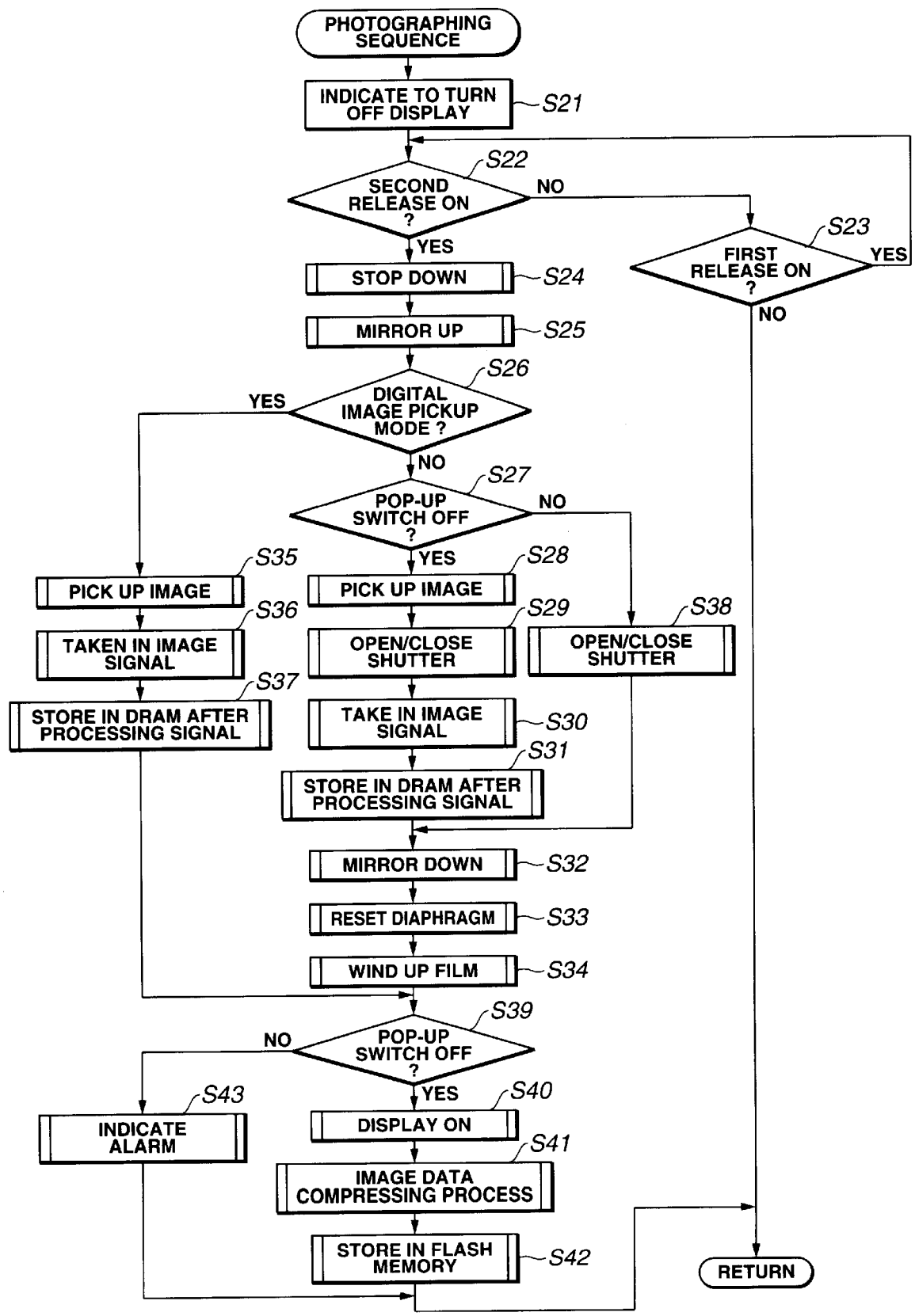
FIG. 9 is a flow chart explaining the operation of a photographing sequence of the silver halide photographic and electronic image pickup camera of the first embodiment.

Next, the operation of the camera of the present embodiment constructed as described above will be explained by using flow charts in FIGS. 7 and 9.

Figure 7:
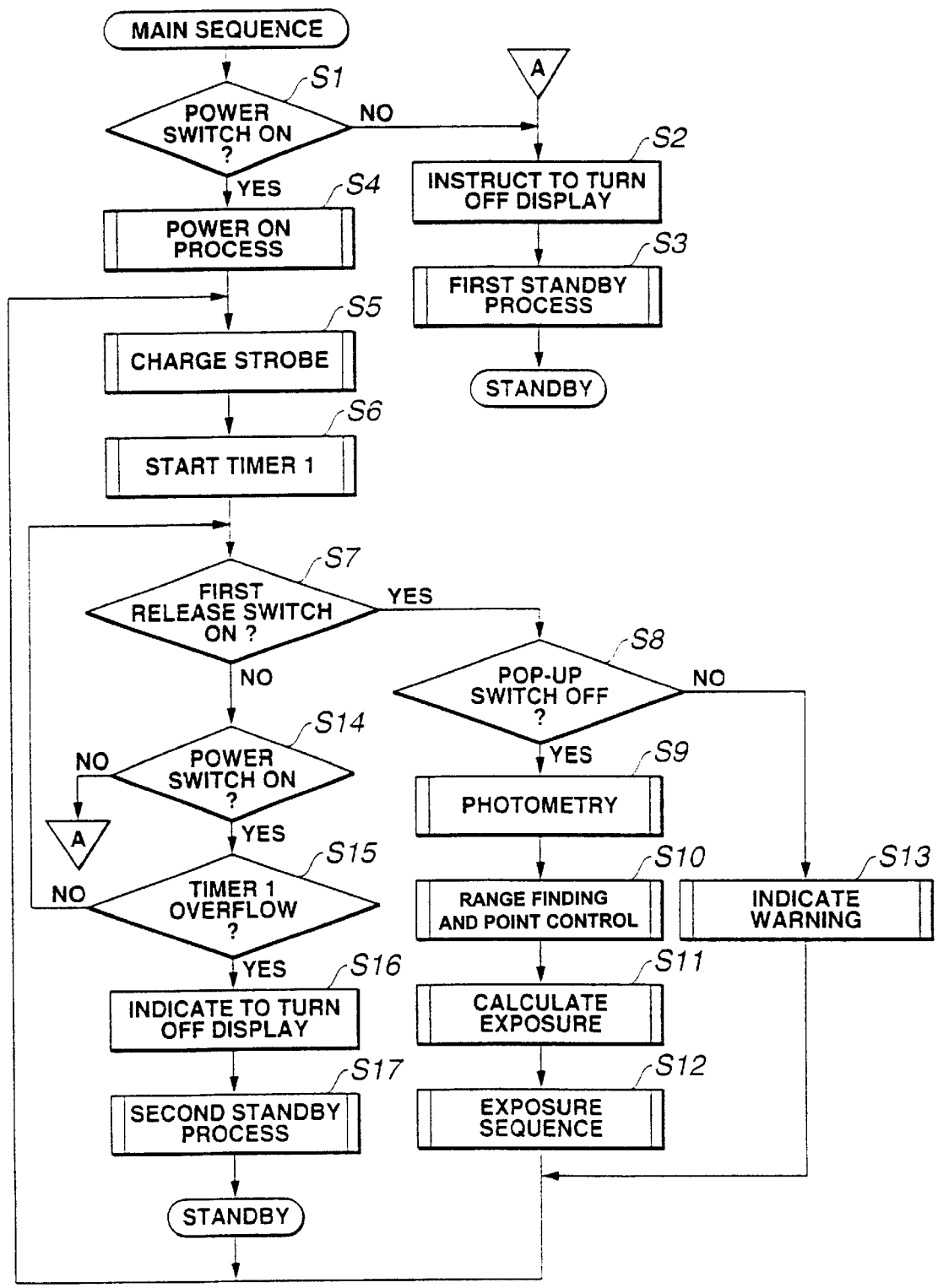
FIG. 7 is a flow chart explaining the operation of a main sequence of the silver halide photographic and electronic image pickup camera of the first embodiment.

A flow chart shown in FIG. 7 is a sub-routine for executing the main sequence of the camera. When the power source (battery) is loaded to the camera, the CPU 60 starts to operate and calls out a sub-routine "main sequence".

The CPU 60 judges whether or not the power switch 10 (power switch 100) of the camera is ON in Step S1. When it is ON, the CPU 60 executes the processes after Step S4 and when the power switch 10 is OFF, executes the processes after Step S2. In Step S2, the CPU 60 instructs to turn off the display by causing the signal processing circuit 31 to stop to supply an image display signal or the like to the LCD monitor 33 and carries out a first standby process in Step S3. The first standby process sets conditions for causing the CPU 60 to start the operation again after the stop of its operation before stopping the operation of the CPU 60. In the first standby process, it is set so as to start the operation when the power switch 10 (power switch 100) is ON and then the operation of the CPU 60 is stopped. When the first standby process is released, the process is executed from the head of the sub-routine "main sequence".

The CPU 60 takes out the camera lenses 40 and 42 from the barrel submerging position of the camera body to the wide position (not shown) and pops up the pop-up unit 11 out of the camera body in Step S4. A main capacitor (not shown) and contained in the strobe control circuit 58 is charged in Step S5. Next, a first timer contained in the CPU 60 starts to count in Step S6. The first timer is a counter which counts up for a predetermined time and which starts to count after its count value is cleared (reset).

Next, the CPU 60 judges whether or not the first release switch 101 is turn ON by pressing the release switch 12 in Step S7. When it is ON, the CPU 60 executes the processes after Step S8 and when it is OFF, the CPU 60 executes the processes after Step S14.

The CPU 60 judges whether or not the pop-up switch 104 is OFF to judge whether or not the pop-up unit 11 has popped up in Step S8. When the pop-up switch 104 is OFF, the CPU 60 judges that the pop-up unit 11 has popped up normally to pop-up position and carries out the processes after Step S9. When the pop-up switch 104 is ON, the CPU 60 judges that the pop-up unit 11 has not popped up by some reason and carries out the processes after Step S13.

In Step S9, the area sensor driving circuit 32 reads the electrical charge obtained by photo-electrically converting the image of the subject formed on the image pickup device 34, the signal processing circuit 31 converts it into a subject image signal to detect a value of brightness of the subject image signal, photometry of the subject is carried out from the value of brightness and the result of photometry is inputted to the CPU 60. Next, the CPU 60 finds the distance between two images based on the signals inputted to the CPU 60 from the line sensor 49 via the line sensor driving circuit 53 to calculate data for driving the camera lenses to the focal position in Step S10. The degree of drive is transferred to the zoom and point driving circuit 50 to change the focal position of the lenses 40 and 42.

After ending the range finding and pint control processes in Step S10, the CPU 60 calculates the value of diaphragm of the first diaphragm mechanism 41 and the shutter speed of the shutter mechanism 44 to obtain the adequate exposure based on the known technology by the value of brightness of the subject obtained in Step S9, the program diagram and the like (not shown) and the sensitivity of film detected by the film sensitivity detecting circuit (not shown) in Step S11. When the camera is set in the electronic image pickup mode, this calculation may be omitted. After ending the calculation of exposure in Step S11, the CPU 60 calls out a sub-routine "exposure (photographing) sequence" of FIG. 9 in Step S12 to carry out the electronic image pickup and silver halide photography.

When the CPU 60 judges that the pop-up unit 11 has not popped up as a result of the judgment in Step S8, it reads a message or an alarm indicating code stored in the ROM (not shown) of the CPU 60 for warning that the pop-up unit 11 has not popped up to give the warning to the LCD monitor 33 in Step S13.

When the CPU 60 judges that the first release switch 101 is not turned ON in Step S7, it judges again whether or not the power switch 100 of the camera is ON in Step S14. When it is ON, the CPU 60 carries out the processes after Step S15 and when it is OFF, carries out the processes after Step S2.

When a predetermined time elapses after the first timer has started to count in Step S6, the first timer overflows in Step S15. The CPU 60 judges whether or not the first timer has overflowed and when it has overflowed, the CPU 60 carries out the processes after Step S16 and when it has not overflowed, returns to Step S7 to execute the processes thereafter repeatedly. This is carried out to put the CPU 60 in the standby state to save energy when no control switch such as the power switch 100 is manipulated even when the predetermined time has elapsed.

A control for turning off the display of the image of the subject which has been formed on the image pickup device 34 and obtained by converting the image signal read under the control of the area sensor driving circuit 32 into the predetermined image signal by the signal processing circuit 31 on the LCD monitor 33 is made in Step S16. Next, a second standby process is carried out in Step S17. This second standby process is carried out to set conditions for causing the CPU 60 to start its operation again after its stop before the CPU 60 stops its operation similarly to Step S3. In the second standby process, the operation of the CPU 60 is stopped after setting the condition so that the operation is started when the switches 100, 101, 102 or 103 linked with the control button change. When the second standby process is released, the process is executed from Step S5.

Thereby, when the pop-up unit 11 has not popped up by some reason, the CPU 60 prohibits to shift to the sequence of exposure on the film 45 and to the sequence of exposure (photographing) by the image pickup device 34 and gives the warning regardless of the shooting mode.

Figure 8:
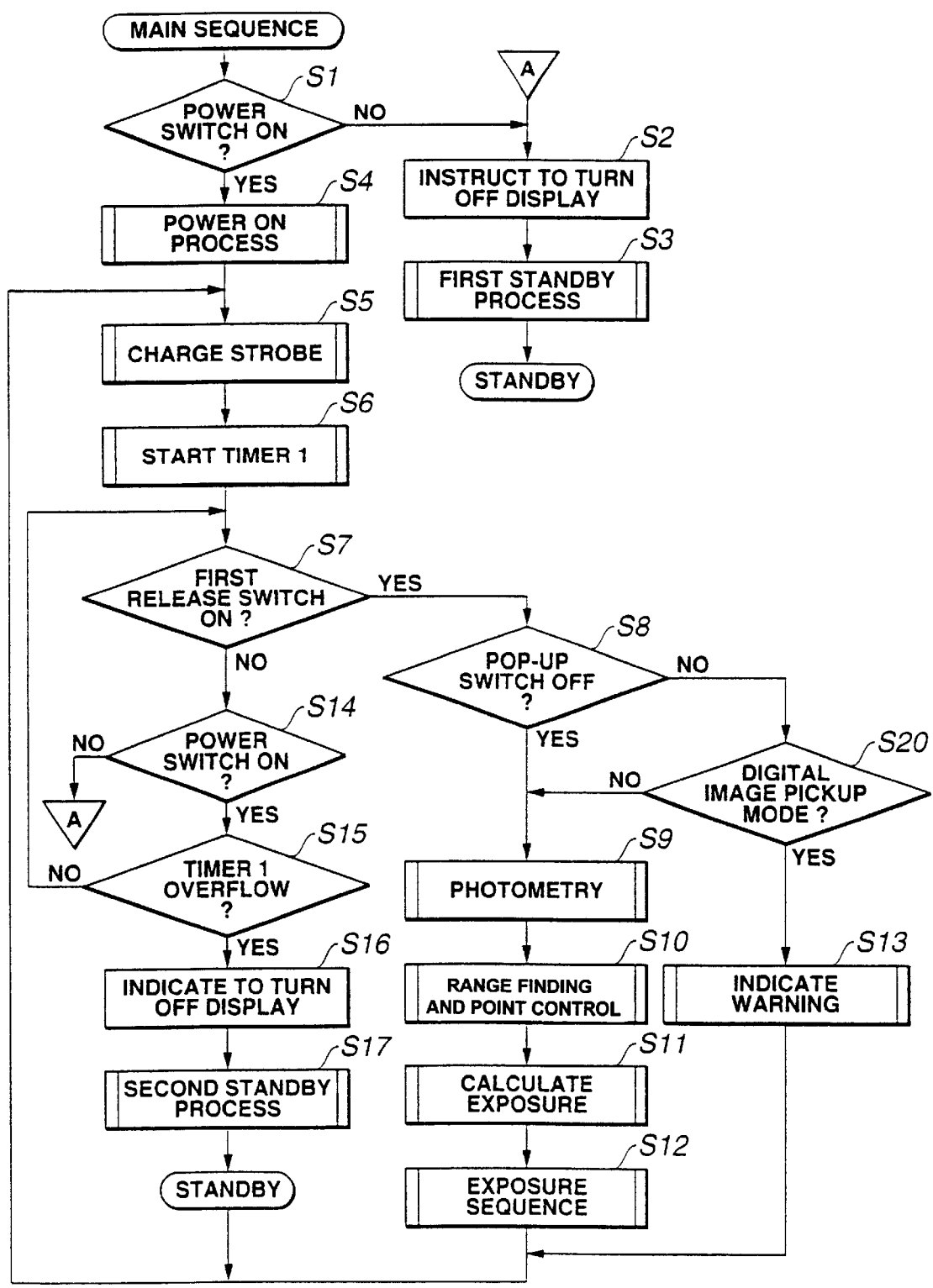
FIG. 8 is a flow chart explaining the operation of a main sequence of a silver halide photographic and electronic image pickup camera of a second embodiment of the invention.

Next, the operation of "main sequence" of the shooting mode of a camera of a second embodiment which is different from that in FIG. 7 will be explained with reference to FIG. 8. The difference between the main sequence in FIG. 8 and the main sequence in FIG. 7 is that a new Step S20 is provided between Step S8 and Step S13 described above. Steps S1 through S17 are otherwise are the same, so that the same reference numerals are used to indicate the respective steps and an explanation thereof will be omitted here.

When the pop-up unit 11 is not popped up and the electronic image pickup mode is set by the shooting mode switch 103 in the new Step S20, the warning informing that the pop-up unit 11 is not popped up is given in Step S13. The pop-up unit 11 must be popped up to pick up images in the electronic image pickup mode. When the electronic image pickup mode is not set by the shooting mode switch 103, the processes after Step S9 are executed even if the pop-up unit 11 is not popped up and only the silver halide photography is carried out in the sub-routine "exposure (photographing) sequence" described later.

It is noted that although the photometric sensor for measuring the brightness of the subject is used together with the image pickup device 34 in the present embodiment, the photometric sensor must be provided separately within the finder 67 for example where it can measure regardless of the pop-up unit 11 in executing only the silver halide photographic mode.

Next, the operation of "exposure (photographing) sequence" after Step S12 will be explained with reference to FIG. 9.

In Step S21, the CPU 60 sends a control signal to the LCD monitor 33 so as to turn off the image signal of the image of the subject photo-electrically converted by the image pickup device 34 and processed by the signal processing circuit 31.

Next, the CPU 60 judges whether or not the second release switch 102 which is turned on in linkage with the release switch 12 when pressed deeply is ON in Step S22. When it is ON, the CPU 60 executes the processes after Step S24. When it is not ON, the CPU 60 executes the judgment in Step S23. The CPU 60 checks the state of the first release switch 101 in Step S23. When it is not ON, the CPU 60 returns to the main routine and when it is ON, the CPU 60 repeats the judgment in Step S22 again.

In Step S24, the CPU 60 drives the first diaphragm mechanism 41 by the output of the diaphragm driving circuit 51 to stop down to a preset value of the diaphragm. This value of the diaphragm is decided by the known technology based on the brightness of the subject, the film sensitivity, the program diagram and others set in Step S11 of the main routine.

After ending to stop down the first diaphragm mechanism 41 in Step S24, the CPU 60 evacuates (mirror up) the movable mirror 43 the outside of the photographing optical path by the output of the mirror driving circuit 52 in Step S25. Next, the CPU 60 judges whether or not the shooting mode set by the shooting mode switch 103 of the switch input 61 is the electronic image pickup (digital image pickup) mode in Step S26. When the electronic image pickup mode is set, the CPU 60 executes the processes after Step S35. When the camera is set in the concurrent shooting mode of silver halide photography and electronic image pickup or in the silver halide photographic mode, the CPU 60 executes the processes after Step S27.

The CPU 60 judges the state of the pop-up switch 104 for detecting the pop-up state of the pop-up unit 11 in Step S27. When the CPU 60 judges that the pop-up switch 104 is OFF (judges that the mode is the concurrent shooting mode of silver halide photography and electronic image pickup), it executes the processes after Step S28. When it judges that the pop-up switch 104 is not OFF (ON state) (judges that the mode is the silver halide photographic mode), it executes the processes after Step S38.

In Step S28, the CPU 60 takes out the image of the subject photo-electrically converted by the image pickup device 34 under the control of the area sensor driving circuit 32 to generate an analog image signal. Next, it drives the shutter mechanism 44 at a preset shutter speed under the control of the shutter driving circuit 54 to expose the image of the subject on the film 45 in Step S29. It is noted that the value of shutter speed of the shutter mechanism 44 driven by the shutter driving circuit 54 is time for opening and closing and driving the shutter mechanism 44 preset by the known technology in Step S11 of the main routine similarly to the value of the diaphragm in Step S24.

Next, the CPU 60 converts the analog image signal taken in by the area sensor driving circuit 32 by a drive control signal generated under the control of the shutter opening and closing control signal in Step S29 into a predetermined digital image signal data by the signal processing circuit 31 in Step S30. The digital image signal data generated in Step S30 is then transferred to and stored in the DRAM 30 in Step S31.

After storing the digital image signal data to the DRAM 30 in Step S31, the CPU 60 carries out a mirror-down process for returning the movable mirror 43 which has been evacuated to the outside of the photographing optical path in the mirror-up operation in Step S25 to the normal position within the photographing optical path in Step S32 and resets the diaphragm for returning the first diaphragm mechanism 41 which has been stopped down to the value of diaphragm in Step S24 to the open state in Step S33.

Next, the film 45 is wound by one frame by the film driving circuit 56 in Step S34. At this time, while predetermined data is magnetically recorded in the magnetic recording layer of the film 45 based on the information data supplied from the magnetic head driving circuit 55 to the magnetic head 46, the information data is written into the magnetic recording layer by using the known technology and its detailed explanation will be omitted here.

When the CPU 60 judges that the shooting mode set by the shooting mode switch 103 in Step S26 is the electronic image pickup mode, the CPU 60 generates the analog image signal of the image of the subject photo-electrically converted by the image pickup device 34 under the control of the area sensor driving circuit 32 in Step S35 similarly to Step S28, takes in the analog image signal into the signal processing circuit 31 to convert it into predetermined digital image data in Step S36 similarly to Step S30 and transfers and stores the digital image signal data generated by the signal processing circuit 31 to the DRAM 30 in Step S37 similarly to Step S31.

When the CPU 60 judges that the pop-up switch 104 is not OFF (ON state) in Step S27, it drives the shutter mechanism 44 at the predetermined shutter speed based on a drive signal from the shutter driving circuit 54 to expose the image of subject on the film 45 in Step S38 similarly to Step S29. After opening/closing the shutter in Step S38, the CPU 60 carries out the mirror-down operation of Step S32.

After ending the process in Step S34 or S37, the CPU 60 judges the state of the pop-up switch 104 again in Step S39. When it is OFF, the CPU 60 carries out the processes after Step S40 and when it is not OFF (ON state), carries out the processes after Step S43.

In Step S40, the CPU 60 instructs the signal processing circuit 31 to carry out the display operation, to read the digital image signal data transferred to and stored in the DRAM 30 in Step S31 or S37 and generates a display image signal to display the image on the LCD monitor 33. Next, the CPU 60 reads the image from the DRAM 30 in Step S41 and compresses the digital image data displayed and confirmed on the LCD monitor 33 in a predetermined manner to write and store in the flash memory 59 in the next Step S42.

When it is judged that the pop-up switch 104 is not OFF (ON state) in Step S39, the CPU 60 indicates and warns that the pop-up unit 11 is not popped up and it is unable to display the electronically picked up image on the LCD monitor 33 in Step S43.

Thereby, when the camera is set in the electronic image pickup mode and the pop-up unit 11 is not popped up, the process for warning that it is unable to pick up an image by the electronic image pickup devices and for prohibiting the image pickup is carried out. When the camera is set in the concurrent shooting mode of electronic image pickup and silver halide photography or in the silver halide photographic mode and the pop-up unit 11 is not popped up, the process for warning that it is unable to pick up an image in the electronic image pickup mode and for prohibiting the image pickup is carried out and only the silver halide photography is executed. After ending the silver halide photography, it becomes possible to give a warning that the subject taken in the silver halide photographic mode cannot be displayed as an electronically picked up image and to eliminate the photographer from erroneously recognizing the shot image on the LCD monitor 33.

In this invention, it is apparent that working modes different in a wide range can be formed on the basis of this invention without departing from the spirit and scope of the invention. This invention is not restricted by any specific embodiment except of being limited by the appended claims.

What is claimed is:

1. A camera, comprising:

exposure means for exposing an image of a subject on a silver halide film;

a pop-up unit capable of popping up out of a camera body to a pop-up position;

image pickup means contained in said pop-up unit and capable of picking up an image of the subject in a state in which said pop-up unit is popped up out of said camera body;

mode setting means for selectively setting a first operation mode of operating both of said exposure means and said image pickup means and a second operation mode of operating only said image pickup means;

detecting means for detecting the position of said pop-up unit; and control means for operating at least on of said exposure means and image pickup means corresponding to the mode set by said mode setting means in response to a manipulation of a release;

wherein said control means operates only said exposure means when said first operation mode is set by said mode setting means and when said detecting means detects that said pop-up unit is not located at the pop-up position.

2. A camera, comprising:

exposure means for exposing an image of a subject on a silver halide film;

a pop-up unit capable of popping up out of a camera body to a pop-up position;

image pickup means contained in said pop-up unit and capable of picking up an image of the subject in a state in which said pop-up unit is popped up out of said camera body;

mode setting means for selectively setting a first operation mode of operating both of said exposure means and said image pickup means and a second operation mode of operating only said image pickup means;

detecting means for detecting whether or not said pop-up unit is popped up; and control means for operating at least one of said exposure means and image pickup means corresponding to the mode set by said mode setting means in response to a manipulation of a release;

wherein said control means prohibits the operation of at least said image pickup means when said detecting means detects that said pop-up unit is not popped up.

3. The camera according to claim 2, further comprising warning means for executing a warning operation when said control means prohibits the operation of said image pickup means.

4. The camera according to claim 2, wherein said control means operates only said exposure means when the first operation mode is set by said mode setting means and said detecting means detects that said pop-up unit is not popped up.

5. A camera, comprising:

exposure means for exposing an image of a subject on a silver halide film;

a pop-up unit capable of popping up out of a camera body to a pop-up position;

image pickup means contained in said pop-up unit and capable of picking up an image of the subject in a state in which said pop-up unit is popped up out of said camera body;

mode setting means for selectively setting a first operation mode of operating both of said exposure means and said image pickup means and a second operation mode of operating only said image pickup means;

detecting means for detecting the position or said pop-up unit; and control means for operating at least one of said exposure means and image pickup means based on the detected result of said detecting means and the mode set by said mode setting means.

6. A camera, comprising:

exposure means for exposing an image of a subject on a silver halide film;

a pop-up unit capable of popping up out of a camera body to a pop-up position;

image pickup means contained in said pop-up unit and capable of picking up an image of the subject in a state in which said pop-up unit is popped up out of said camera body;

detecting means for detecting the position of said pop-up unit; and control means for operating said exposure means in response to a manipulation of a release and for operating said image pickup means in linkage with the operation of said exposure means;

wherein said control means operates only said exposure means when said detecting means detects that said pop-up unit is not located at the pop-up position.

7. A camera, comprising:

a camera body;

an exposure mechanism for executing an exposure operation for exposing an image a subject on a silver halide film;

a pop-up unit capable of moving from a position stored in said camera body to a position popped up out of said camera body;

a detecting switch for detecting that said pop-up unit is popped up out of said camera body;

image pickup devices contained in said pop-up unit to pick up said image of the subject; and a control circuit for controlling said exposure mechanism to execute said exposure operation;

wherein said control circuit operates said image pickup devices in synchronism with said exposure operation only when said detecting switch detects that said pop-up unit is popped up.

8. The camera according to claim 7, wherein said pop-up unit includes a strobe flashing section.

9. A camera, comprising:

a camera body;

an exposure mechanism for executing an exposure operation for exposing an image of a subject on a silver halide film;

a pop-up unit capable of moving from a position stored in said camera body to a position popped up out of said camera body;

a detecting switch for detecting that said pop-up unit is popped up out of said camera body;

image pickup devices contained in said pop-up unit to pick up said image of the subject a control circuit for executing the exposure operation by said exposure mechanism and the image pickup operation by said image pickup devices at the same time; and a display circuit for displaying a warning when said detecting switch detects that said pop-up unit is not popped up.

10. The camera according to claim 9, wherein said display circuit comprises a liquid crystal display device.

* * * * *